United States Patent [19]
Greenfield

[11] 3,904,522

[45] Sept. 9, 1975

[54] PROCESS OF INHIBITING SCALE USING AN ACRYLIC COMPOSITION

[75] Inventor: George L. Greenfield, Houston, Tex.

[73] Assignee: Milchem Incorporated, Houston, Tex.

[22] Filed: Oct. 24, 1973

[21] Appl. No.: 409,028

Related U.S. Application Data

[62] Division of Ser. No. 244,952, April 17, 1972, Pat. No. 3,787,488.

[52] U.S. Cl.............. 210/58; 166/279; 252/8.55 B; 252/180; 252/181
[51] Int. Cl.² ........................................... C02B 5/00
[58] Field of Search ............... 252/180, 181, 8.55 B; 210/58; 166/279

[56] References Cited
UNITED STATES PATENTS
3,756,257  9/1973  Rice et al............................. 252/180

Primary Examiner—Benjamin R. Padgett
Assistant Examiner—Deborah L. Kyle
Attorney, Agent, or Firm—William C. Norvell, Jr.

[57] ABSTRACT

A product of the process for preparing an acrylic composition which is formed from about 80 to 90 parts by weight acrylic acid, about 7 to 15 parts by weight of 2-mercaptoethanol, and about 1.5 to 5 parts by weight ammonium persulfate. The produced material has particular utility as a scale inhibitor in hard water environments.

11 Claims, No Drawings

3,904,522

PROCESS OF INHIBITING SCALE USING AN ACRYLIC COMPOSITION

CROSS REFERENCE TO RELATED APPLICATIONS

This is a division of application Ser. No. 244,952, filed Apr. 17, 1972, now U.S. Pat. No. 3,787,488.

BACKGROUND OF THE INVENTION

1. Field of the Invention

The present invention relates to a process for making an acrylic composition which is useful, for example, in water treatment apparatuses, oil and gas well, producing formations, and other scale-containing or scale-attracting surfaces, said composition being formed by reacting starting materials in a one multistage process.

2. Description of the Prior Art

The utilization of aqueous systems which generally contain organic compounds, and the production and processing of hydrocarbons containing such impurities are impaired by the precipitation of these impurities, resulting in the formation of a solid material, commonly referred to as "scale." In the case of aqueous environments, the harmful effects of the formation of scale are generally confined to the reduction of the capacity of receptacles and conduits such as boilers, seawater evaporators and the like, which are employed to store, treat, and/or convey water. In the case of conduits, the impedance of flow is a direct result of scale formation. Other consequences are not as obvious and will appear only after significant damage has already occurred. For example, scale formed upon the surfaces of storage vessels and conveying lines for process water may break loose. These large masses of deposit are entrained in and conveyed by the water to damage and clog equipment through which water is passed, i.e., tubes, valves, filters, and screens. Additionally, these deposits may appear in and detract from the final product which is derived from the process; for example, paper formed from an aqueous suspension of pulp. Furthermore, when the contaminated water is involved in a heat exchange process, scale will be formed upon the heat exchange surfaces which are contacted by the water. This not only impairs heat transfer efficiency, but will also reduce system flow.

High levels of scale precipitation and growth in the production and processing of hydrocarbons may be supplied by process fluids employed in the production of the petroleum such as drilling fluids, water flooding chemicals employed to pressurize the production formations, and the like. In addition, deposits leached and eroded from producing and adjacent formations such as limestone and from salt solutions of brines which are admixed with crude hydrocarbons often contribute substantially to the formation and accumulation of scale. The tendency of these contaminants to precipitate and form scale is accelerated by changed physical conditions which attend the withdrawal of hydrocarbons from producing formations. Specifically, the extensive reduction of pressure which results from hydrocarbon withdrawal permits the release of carbon dioxide with the consequent super-saturation of the brines or salt solutions contained by the hydrocarbons.

In addition to increased scale potential, petroleum production and processing are also characterized by a number of phases in which scale formation is particularly troublesome. For example, the precipitation of contaminants is commonly experienced upon the withdrawal of the hydrocarbons from the producing formation and is accelerated by reduction in pressures and brine saturation. As a consequence, plugging of the producing formation, well-strainers, valves, tubings, and the like, is experienced from time to time. Scale is also formed upon surface storage and processing equipment such as pipes, valves, heating coils and tubes, separators, scrubbers, heater-treaters, etc. In many of these processes, scale reduces heat transfer and operating efficiency as well as impeding flow and contributing to mechanical failures such as the bending or clogging of pumps and valves.

Other crucial areas for the precipitation and accumulation of scale are saline water evaporators, black liquor evaporators, boilers for the conversion of water to steam and evaporators in which raw sugar juice is concentrated.

In the case of saline evaporators, the evaporation of sea or saline water gives rise to the formation of scale deposits of low thermal conductivity on the heat transfer surfaces of the distillation plant. This causes a reduction in heat transfer coefficients which in turn causes deterioration in plant performance necessitating eventual shutdown of the plant for cleaning. In these heat transfer vessels, scale may be formed whenever scale-forming compounds are presented in the feed water. However, the type and composition of the scale may vary. For example, when evaporation of seawater takes place under reduced pressure at boiling temperatures below 148°F, the main scaling material is calcium carbonate. However, at increased temperatures, it is primarily magnesium hydroxide in the form of brucite. Nevertheless, calcium sulfate scale may be formed at all temperatures if the brine concentration is sufficiently high.

When steam generation boilers and similar vessels are operated using water and heat transfer as a processing mechanism in, for example, black liquor evaporation processes, a buildup of scale deposit formation results in decreased overall efficiency. The deposit formation tends to decrease heat transfer requiring an increased heat input to accomplish the desired evaporation. These deposits, which are very similar to those found in seawater evaporators and in lines, storage tanks and the like, and in hydrocarbon production, are primarily organic residues and/or soluble salts which can be removed by boil-outs with water or costly treating chemicals which, under some operating conditions, simply cannot be economically tolerated.

In each of these areas of buildup, while calcium sulfate and calcium carbonate are primary contributors to scale formation, other salts of alkaline-earth metals and the aluminum silicates are also apparent. Magnesium carbonate, barium sulfate and aluminum silicate provided by silts of the bentonitic, illitic and kaolinitic types often pose considerable scale problems in these aqueous and hydrocarbon environments.

In U.S. Pat. Application Ser. No. 851,085, filed Aug. 18, 1969, entitled "Acrylic Composition for Water Treatment and Process for Making Same," it was discovered that a unique acrylic composition could be formed by utilizing particular amounts of acrylic acid, thioglycolic acid and ammonium persulfate. This material has unique surface active properties. However, the use of thioglycolic acid in the composition has some undesirable characteristics. This material has a particular mercaptan odor which, in many applications, may be offensive. This odor can be somewhat reduced, however, by the use of hydrogen peroxide. Other disadvantages in the use of thioglycolic acid include the fact that it is extremely expensive and is somewhat difficult to handle health-wise in the preparation of the acrylic composition. Also, the use of thioglycolic acid in the preparation of the acrylic composition has been found to produce a high degree of reduction-oxidation during the reaction, reducing the amount available as a chain transfer agent. In an attempt to overcome these problems, many other chain transfer agents were tried in our laboratory experiments in order to prepare a satisfactory acrylic composition. However, for a variety of reasons, none were acceptable until the discovery of the present invention. Suprisingly, we have found that the use of 2-mercaptoethanol which is normally not used in the preparation of commercially available acrylic acid or ester products will provide an excellent acrylic composition and can be substituted for the thioglycolic acid as disclosed in U.S. Pat. Application Ser. No. 851,085. The use of this material does not have the disadvantages found in the use of thioglycolic acid. Moreover, it has been found that 2-mercaptoethanol may be substituted at slightly less than mole-per-mole ratios for thioglycolic acid and will produce an acrylic composition with identical viscosity and other physical properties which are so essential to the successful application of the acrylic composition in, for example, water treatment processes for the removal of scale and the like. Economically, the use of 2-mercaptoethanol will reduce the cost of the addition of a chain transfer agent from about 25 to about 50%, depending, of course, on the volume prepared either batch wise or by other commercial preparations. It is of special importance to note that 2-mercaptoethanol has a lower molecular weight than thioglycolic acid and is approximately 10% more efficient than thioglycolic acid in normal commercial preparation methods.

It is, therefore, an object of the present invention to provide an improved acrylic composition.

Other objects and advantages of this invention will be apparent from the following description, examples, and claims.

SUMMARY OF THE INVENTION

The improved acrylic composition produced by reacting acrylic acid, 2-mercaptoethanol, and ammonium persulfate has been found to be analytically extremely complex in nature. The composition is produced by a combination of the processes of polymerization, oligomerization, isomerization, condensation and free radical fragmentation effects. 2-mercaptoethanol acts as a chain transfer agent in polymerization. Additionally, it undergoes a variety of chemical reactions. It is capable of reacting with acrylic acid and/or free radical fragments produced in the system by the rapid reactions that are obtained.

The process for obtaining the acrylic composition utilizes the simultaneous reaction of acrylic acid in the presence of 2-mercaptoethanol and ammonium persulfate at temperatures ranging from about room temperature to about 80°C. This reaction is exothermic and it is normally conducted in a solution. It has been discovered that any solvent or solvent system may be used which will dissolve the reactants without reacting in any substantial amount with the reactants or with the composition of the invention. For example, water, ethylene glycol and dimethyl formamide have been used as solvents in the production of the present acrylic composition. Presently, preferred is an aqueous solvent system or water alone, without being distilled or treated for the removal of impurities.

Upon initiation of the reaction by temperature or mutation catalysts, the quantities of 2-mercaptoethanol and ammonium persulfate will react instantly with one another and with the acrylic acid, causing a slight exotherm to occur. This reaction is generally complete within one to five minutes as measured by lack of volatile matter in determining the total solids content on a sample of product using a moisture balance or a vacuum oven at 100°C with a 25 inch vacuum. Oxygen dissolved in the aqueous reaction medium, or other solvent medium need not be removed by purging the system with nitrogen or by other means.

We presently prefer to utilize any grade of commercially available glacial acrylic acid as the starting primary reactant. Acrylic acid containing 200 parts per million of methyl ether of hydroquinone or similar inhibitor may also be used.

The amount of acrylic acid to be reacted in a single reaction stage may range from about 5 to about 30% by weight of the total solvent system or solvent (including the reactants). The actual amount will, of course, depend on the cooling process available for control of the reaction exotherm as above described. If no cooling system is available, it is preferable to react 5 to 10% of acrylic acid by weight of the total solvent system. However, if cooling water or other cooling means are available, somewhat more acrylic acid from about 25 to about 30% by weight of the total solvent system may be reacted successfully. By incremental additions of any desired number of aliquot portions of the reactants whereby each successive addition made after the preceding incremental addition has completed its reaction a relatively higher portion of reactants to solvent may be used without difficulty in controlling the reaction temperature. The amount of solvent used for either single stage of multi-stage reactions is not critical, but will normally be above about 330 parts by weight for 100 parts acrylic acid utilized. However, if desired, higher amounts of solvent or solvent system may be used. As more solvent is used, the solids content of the acrylic composition made according to the present invention (including solvent) will be substantially reduced. Normally, for most commercial applications, a high solids liquid product will be desirable.

The amounts of 2-mercaptoethanol and ammonium persulfate to be reacted are conveniently determined by the charge weight or amount of acrylic acid utilized in the preparation of the present composition. An amount of 2-mercaptoethanol may be used in a range from about 5 to about 12% by weight of the acrylic acid utilized. However, about 10% by weight 2-mercaptoethanol is presently preferred. The ammomium persulfate used in the preparation of the acrylic composition is preferably a commercially available technical grade material. About 2 to about 5% by weight ammonium persulfate based upon the weight of acrylic acid may be used, and about 4% of this reactant is preferred. Preferred acrylic compositions have been prepared by utilizing all of the ammonium persulfate at the initiation of the reaction. However, it has been found that incremental additions of this reactant with each charge of acrylic acid are equally effective.

The present process involves a reaction which may require catalytic initiation. If the reaction process is to be conducted at room temperature, the use of from about 5 ppm to about 30 ppm of a catalytic ion selected from the class consisting of ferric, ferrous, or cupric may be required. If starting temperatures of 50°C or more are used, enough energy will be present in the reaction system to activate the reactants without recourse to the use of the catalytic ion. Ammonium persulfate will generally serve as initiator at high temperatures.

The acrylic composition of the present invention is effectively utilized for scale prevention and descaling. The amount of the acrylic composition necessary to inhibit or remove scale will vary depending upon the particular application at hand. In our laboratory threshold test, described in detail in Example IV, we have found that levels as low as 9 ppm of a 30.3% aqueous solution will be sufficient to significantly reduce the scale on surface of testing apparatuses. However, an increased treatment level may be desirable when encountering extreme scale conditions. For example, when using the material in connection with, for example, floodwater operations, treatment levels as high as 50 to 200 ppm may be desirable or necessary.

The process of inhibiting and removing scale of the present invention utilizes the above described composition and comprises introducing the composition onto the surface area to be protected, such as the internal metallic tubing or lining of boilers, in the form of an aqueous solution in an amount sufficient to inhibit or remove the scale and generally to provide from about 5 ppm to about 200 ppm of the solution and maintaining the composition in contact with the surfaces for a period sufficient to inhibit the development of scale deposits thereon or to remove said scale deposits therefrom. It may be desirable to circulate the composition through the treated system to provide sufficient contact of the composition with the surface to be protected. For example, underground strata surrounding a well bore can be treated by passing an aqueous solution of the acrylic composition into the strata by injection of the solution down through the borehole or production tubing preferably under pressure.

The acrylic composition produced as above described is an aqueous acidic composition and is a relatively non-viscous Newtonian fluid which will dissolve in suprisingly high concentrations of electrolytes. It has been found that practical (2% by weight) concentrations of this composition are soluble in sodium chloride and calcium chloride in brine of over 20% activity by weight.

If desired, the solvent may be evaporated to produce an amorphorous, glass-like brittle solid which can be reduced to a powder. The solid is readily soluble in water. A neutralized form of the acrylic composition is presently preferred to avoid problems of handling the corrosive acid form. The solvent may also be removed from this product to obtain a dry powder or a granular material.

The acrylic composition of the present invention is a reaction product of about 80 to about 90 parts by weight acrylic acid; about 5 to about 11 parts by weight 2-mercaptoethanol, and about 1.5 to 5 parts ammonium persulfate. The presently preferred acrylic composition is the reaction of about 88 parts by weight acrylic acid; 8 parts by weight 2-mercaptoethanol; and 3.5 parts by weight ammonium persulfate. Preparations of the acrylic composition of this invention have been found to have a number average molecular weight in the range 500 to 1,000. Molecular weight can be determined using an Hitachi Perkin-Elmer Model 115 Vapor Pressure Osmometer. A sample of the acrylic composition may be evaporated to dryness and dissolved in N, N-Dimethylformamide, and thereafter filtered to remove inorganic residuals. This solution can be made to a known concentration. The imbalance of 2 thermistors can be measured across a pair of thermistor beads calibrated on a series of varying concentrations of benzil (MW 210) in the same solvent at main oven setting of 55°C, and suboven setting of 50°C.

Typically, the acrylic composition of the present invention, at a level of 25 to 30% solids by weight, will have a pH of about 2 and a viscosity ranging from about 6 cp to about 20 cp. As used herein, viscosities are usually determined at 25° or 30°C using a Fann Viscometer rotating at 300 rpm. Generally speaking, a reference to 25° or 30°C is also meant to refer to "room temperature." A Fann Viscometer measurement depends on torque forces supplied to a stationery suspended cylinder within a larger concentric cylinder shearing a liquid in contact with both cylinders at a given shear rate. For the reason that a viscosity value loses significance as an indication of molecular weight in the molecular range of 500 to 1,000 it is deemed preferable to designate the acrylic composition as a polyfunctional electrolyte or as a low molecular weight polyelectrolyte of complex chemical character.

The acrylic composition produced by the process described herein is acidic and will begin to precipitate a complex low molecular weight sulfur bearing fraction due to crystallization when the acidic solution ages for several days at room temperature. To avoid this and to render the acidic acrylic composition less corrosive for practical use purposes, it may be preferred that the acidity of the composition be neutralized. Convenient alkaline materials suitable for the neutralization procedure may include sodium, potassium, or ammonium hydroxide, and mono, di, or tri-alkanol amines, and the like.

Although other types of reactors may be utilized in the preparation of the acrylic composition of the present invention, it has been found that a batch reactor obtains very satisfactory results. This reactor is a jacketed pressure vessel with individual inlets for the acrylic acid, ammonium persulfate, and 2-mercaptoethanol reactants. The reactor contains a turbine agitator which insures complete mixing of the reactants. The initial reaction temperature is maintained by the addition of steam and cooling water to the reactor jacket. During the reaction each reactant is added in regularly prescribed sequences through individual charge lines. The preweighed acrylic acid and reaction dilution water are charged to the reactor by means of pumps and are brought to reaction temperature through the application of steam to the reactor jacket. Two charges of concentrated ammonium persulfate and one charge of 2-mercaptoethanol are prepared for reaction and are placed in appropriate charge pots located above the reactor vessel. Each reactant is added in sequence below the solution surface by means of individual pressurized charge lines.

The initial stage of the manufacturing process entails the use of deionized dilution water, acrylic acid solution, 2-mercaptoethanol, and ammonium persulfate. The solution water is loaded through the top of the reactor vessel and is heated to about 170°F.

After the water in the reactor is heated to about 170°F, the acrylic acid solution is added to the reactor through the manifold; and the temperature of the aqueous solution and the reactor will cool to about 158°F. After the acrylic acid load has been completed, the 2-mercaptoethanol charge pot should have an increased pressure of between 40 psi and 50 psi, and the charge pot is opened to introduce the 2-mercaptoethanol into the reactor. This pressure is needed to increase the pressure of low points in the 2-mercaptoethanol reducing agent line in order to place all of the 2-mercaptoethanol into the reactor. After the ammonium persulfate charge pots have obtained a pressure of between 40 to 50 pounds per square inch (p.s.i.) and the reaction solution has cooled to about 158°F, the initial ammonium persulfate charge pot is opened, releasing the additive into the reactor vessel. The temperature should increase sharply to about 190°F. Generally, this increase in temperature should occur within one minute after the addition of the initial amount of ammonium persulfate. An additional amount of ammonium persulfate is then placed into the reactor, causing a peak temperature between 200° and about 210°F. This additional amount of ammonium persulfate assures complete reaction of all of the acrylic acid solution.

Although neutralization of the acrylic composition of the present invention is not essential, it has been found that partial and complete neutralization will lower corrosivity and yield a product which will not be dangerous to handle. To obtain a neutralized product, a final stage, as described earlier, can be initiated which will entail the use of sodium hydroxide or the like as a neutralizing agent. This stage is begun when the acrylic solution is cooled to a temperature of about 150°F or less. The amount of neutralizing agent depends on whether the acrylic composition is to be partially neutralized, completely neutralized, or neutralized over 100%, based on acrylic acid stoichiometry. The neutralizing agent should be added slowly in order to prevent the formation of steam. The small amount of water lost in this step may be replaced as desired.

The following examples will further describe the novel qualities of the composition of the present invention:

EXAMPLE I

The acrylic composition of the present invention was made by first placing 1021.5 grams of deionized water into a reaction vessel, which was stirred continuously and heated to a temperature of over 75°C. A charge of 127 grams of glacial acrylic acid was then placed into the vessel. This charge was followed by a 6.35 gram charge of 2-mercaptoethanol. One half minute after the addition of the 2-mercaptoethanol, a 13.3 gram addition of an aqueous 33.3% ammonium persulfate solution was placed into the vessel. This addition caused an immediate exotherm, raising the reactant temperature to over 90°C. A 4.4 gram addition of an aqueous 33.3% ammonium persulfate solution was then placed into the vessel. The vessel contents were allowed to cool to 70°C. After sufficient cooling, the second of the three 127 gram charges of glacial acrylic acid solution was placed into the vessel, resulting in a temperature decrease to 65 C. Another 6.35 gram charge was made of 2-mercaptoethanol which was followed one-half minute later by a charge of 13.3 grams of an aqueous 33.3% ammonium persulfate solution. An exothermic reaction occurred which caused an increased temperature to about 83°C. Before cooling commenced, a 4.4 gram charge of the aqueous 33.3% ammonium persulfate solution was added. The vessel contents were allowed to cool to a temperature of about 70°C. A final 127 gram charge of glacial acrylic acid was placed into the vessel, which lowered the temperature to 65°C. A final addition of 6.35 grams of 2-mercaptoethanol was added to the vessel contents followed 30 seconds later by 13.3 grams aqueous solution ammonium persulfate, resulting in an exothermic reaction and a temperature of about 80°C. A final addition of 4.4 grams of an aqueous 33.3% ammonium persulfate solution was placed into the vessel. This acrylic composition has, at a specific gravity at 25°C of 1.100, a viscosity at 25°C of 11.8 centipoises. The material was neutralized with sodium hydroxide to obtain a pH of about 6.8. The solids of the solution was 32.6% and the viscosity at 25°C was 43 centipoises. In this example, 5% 2-mercaptoethanol based on the utilized acrylic acid was used in the process.

EXAMPLE II

An acrylic composition was prepared as in Example I except that 7% 2-mercaptoethanol was utilized based on the amount of acrylic acid utilized. The resulting material had a specific gravity at 25°C of 1.100, a viscosity at 25°C of 9.90 centipoises. The material was neutralized with sodium hydroxide and had a solids of 31.9%, a viscosity at 25°C of 28.2 centipoises and a pH of about 6.9.

EXAMPLE III

The procedures defined in Examples I and II were followed except that 10% 2-mercaptoethanol was utilized based on the amount of acrylic acid in the reaction. The obtained composition had a specific gravity at 25°C of 1.085, and a viscosity at 25°C of 5.7 centipoises. The material was neutralized with sodium hydroxide to a pH of about 6.1 and had a solids of 30.3%, and a viscosity at 25°C of 17.05 centipoises.

EXAMPLE IV

A standard calcium sulfate threshold performance test was conducted utilizing a 33 1/3% solution of the salt of the compositions made as in Examples I, II, and III in parts per million (ppm) levels of 0 (blank), of 1 to 20, 50, 100 and 200, respectively. 100 CC of a solution containing 20.9 grams of $Na_2SO_4$ and 200 grams NaCl per liter was prepared and added to 8 ounce test bottles. To the test bottles was then added 100 CC of a solution containing 21.9 grams of $CaCl_2 \cdot 2H_2O$ and 200 grams of Na Cl per liter. A clean glass microscope slide was then inserted into each bottle. The bottles were capped and tightened to avoid moisture loss upon heating. The bottles were then placed in a preset 70°C oven for approximately 18 hours. After this period the bottles were removed and the cells, slides and solution surfaces were examined for the presence of calcium sulfate scale. The calcium sulfate threshold concentration of the test chemical is the concentration required to maintain a completely crystal free test solution. The results of this test indicated threshold concentrations as follows:

Table 4

| Example Sample | Amount (ppm) |
|---|---|
| I | 14 |
| II | 10 |
| III | 9 |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A process for inhibiting the formation of scale on a surface in contact with an aqueous system containing chemicals having a tendency to form said scale, which process comprises contacting said surface in an effective scale removing amount with an aqueous solution of an acrylic composition formed by reacting at a temperature of from 24° to 80°C. in an aqueous solution (1) acrylic acid of between 5% and 30% by weight of the total aqueous solution with (2) 2-mercaptoethanol of between 5% and 12% by weight of the acrylic acid utilized and with (3) amonium persulphate of between 2% and 5% of the acrylic acid used.

2. The process of claim 1 wherein the scale inhibiting amount of said composition is from about 5 ppm to about 200 ppm.

3. The process of claim 1 wherein said aqueous system is a brine.

4. The process of claim 1 wherein said aqueous system is water.

5. The process of claim 1 wherein said surface is the internal metallic lining of a steam boiler.

6. The process of claim 1 wherein said surface is a subterranean formation.

7. The process of claim 1 wherein said surface is the internal lining of an evaporator.

8. The process of claim 1 wherein the scale is calcium carbonate.

9. The process of claim 1 wherein the scale is calcium sulfate.

10. The process of claim 1 wherein the scale is barium sulfate.

11. The process of claim 1 wherein the scale is aluminum silicate.

* * * * *